United States Patent
Gidley et al.

(10) Patent No.: US 12,554,378 B2
(45) Date of Patent: Feb. 17, 2026

(54) MEDIA CONTENT ITEM SELECTION

(71) Applicant: Nagravision Sàrl, Cheseaux (CH)

(72) Inventors: Benjamin Gidley, Cwmbran (GB); Jonathan Bennett-James, Cwmbran (GB)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 88 days.

(21) Appl. No.: 18/549,008

(22) PCT Filed: Mar. 4, 2022

(86) PCT No.: PCT/EP2022/055629
§ 371 (c)(1),
(2) Date: Sep. 5, 2023

(87) PCT Pub. No.: WO2022/189306
PCT Pub. Date: Sep. 15, 2022

(65) Prior Publication Data
US 2024/0152254 A1  May 9, 2024

(30) Foreign Application Priority Data
Mar. 10, 2021 (EP) .................................. 21161815

(51) Int. Cl.
*G06F 3/0482* (2013.01)
*G06F 3/0485* (2022.01)
(Continued)

(52) U.S. Cl.
CPC .......... *G06F 3/0482* (2013.01); *G06F 3/0485* (2013.01); *G06V 10/56* (2022.01); *G06V 10/761* (2022.01)

(58) Field of Classification Search
CPC .... G06F 3/0482; G06F 3/0485; G06F 3/0484; G06V 10/56; G06V 10/761; G06V 10/75; G06V 10/759
See application file for complete search history.

(56) References Cited

U.S. PATENT DOCUMENTS 8,090,712 B2  1/2012  Shellshear
9,615,136 B1 *  4/2017  Emery .................. G06F 16/743
(Continued)

FOREIGN PATENT DOCUMENTS

WO  2022189306  9/2022

OTHER PUBLICATIONS

Etienne Gadeski et al., Duplicate image detection in s stream of web visual data, Jun. 1, 2015, International Workshop on Content-Based Multimedia Indexing, pp. 1-6 (Year: 2015).*

(Continued)

*Primary Examiner* — Tam T Tran
(74) *Attorney, Agent, or Firm* — POLSINELLI LLP

(57) ABSTRACT

A computer implemented method comprising accessing representations for a plurality of corresponding media content items, each media content item having at least one corresponding representation, the representations being organized in an order in one or more sets of the representations, each representation comprising at least one of metadata for a corresponding media content item and an image for a corresponding media content item, each representation being for display to a user to enable the user to select to access the corresponding media content item, each set of representations being displayable as a scrollable list; using the order of the representations to determine display locations of the representations in the scrollable list in a display arrangement; comparing similarity of content of representations within a display range; and where representations are (Continued)

determined to have greater than a predetermined similarity, changing the order of at least one of the representations determined to have greater than a predetermined similarity to change the display location in the scrollable list of the at least one of the representations.

15 Claims, 9 Drawing Sheets

(51) Int. Cl.
*G06V 10/56* (2022.01)
*G06V 10/74* (2022.01)

(56) References Cited

U.S. PATENT DOCUMENTS

2002/0110276 A1* 8/2002 Kasutani ............. G06F 16/5838
382/165
2012/0240236 A1* 9/2012 Wyatt ..................... G06F 21/10
726/25
2017/0068870 A1* 3/2017 Lindholm ............... G06F 16/50

OTHER PUBLICATIONS

Jelle Nelis et al., Intelligent Distributed Multimedia Collection: Content Aggregation and Integration, Oct. 1, 2011, Annual IEEE Conference on Local Computer Networks, pp. 203-206 (Year: 2011).*
"Internationsl Application Serial No. PCT EP2022 055629, International Search Report mailed May 12, 2022", 4 pgs.
"Internationsl Application Serial No. PCT EP2022 055629, Written Opinion mailed May 12, 2022", 5 pgs.

* cited by examiner

MEDIA CONTENT ITEM SELECTION

PRIORITY APPLICATIONS

This application is a U.S. National Stage filing under 35 U.S.C. § 371 of PCT Patent Application No. PCT/EP2022/055629, filed on Mar. 4, 2022, which claims priority to European Patent Application Serial No. 21161815.2, filed on Mar. 10, 2021, the disclosures of which are incorporated by reference herein in their entireties.

FIELD

The present disclosure relates generally to a method and system enabling the selection of a media content item by a user, and more specifically to a method and system for displaying representations of media content with reduced occurrences of similar representations being displayed near each other.

BACKGROUND

Conventionally, media content guides are displayed on a display of a user device to provide information to a user regarding what content is available for viewing or listening to in a manner enabling a user to make a selection of a representation of a media content item for the playing (viewing or listening) of the media content item. The representations of the media content items may be in the form of text or an image, such as an image of cover art generated as a representation for the media content item. Traditionally cover art was generated as a cover for a physical media content item such as a tape, record or disc (CD or DVD). The physical media content form is now almost completely replaced in the market by electronic media, but the cover art still performs the same function of drawing a user's attention to select the media content item.

When media content is available for access on demand or from recorded storage, the media content guide need not display representations of the available content in a time bound manner as is conventional for broadcast media content. In such circumstances, it is known in the art to display representations of media content items in media content guides as a series of scrollable rows or rails. A user is able to interact with a displayed row or rail of representations to scroll through a list or set of media content items to enable the user to make a desired selection from a number or representations larger than can be displayed at one time on the display of the user device.

SUMMARY

The present invention provides a method and system as defined in the appended claims.

BRIEF DESCRIPTION OF DRAWINGS

Various ones of the appended drawings merely illustrate example embodiments of the present invention and cannot be considered as limiting its scope.

DETAILED DESCRIPTION

Figure 1:
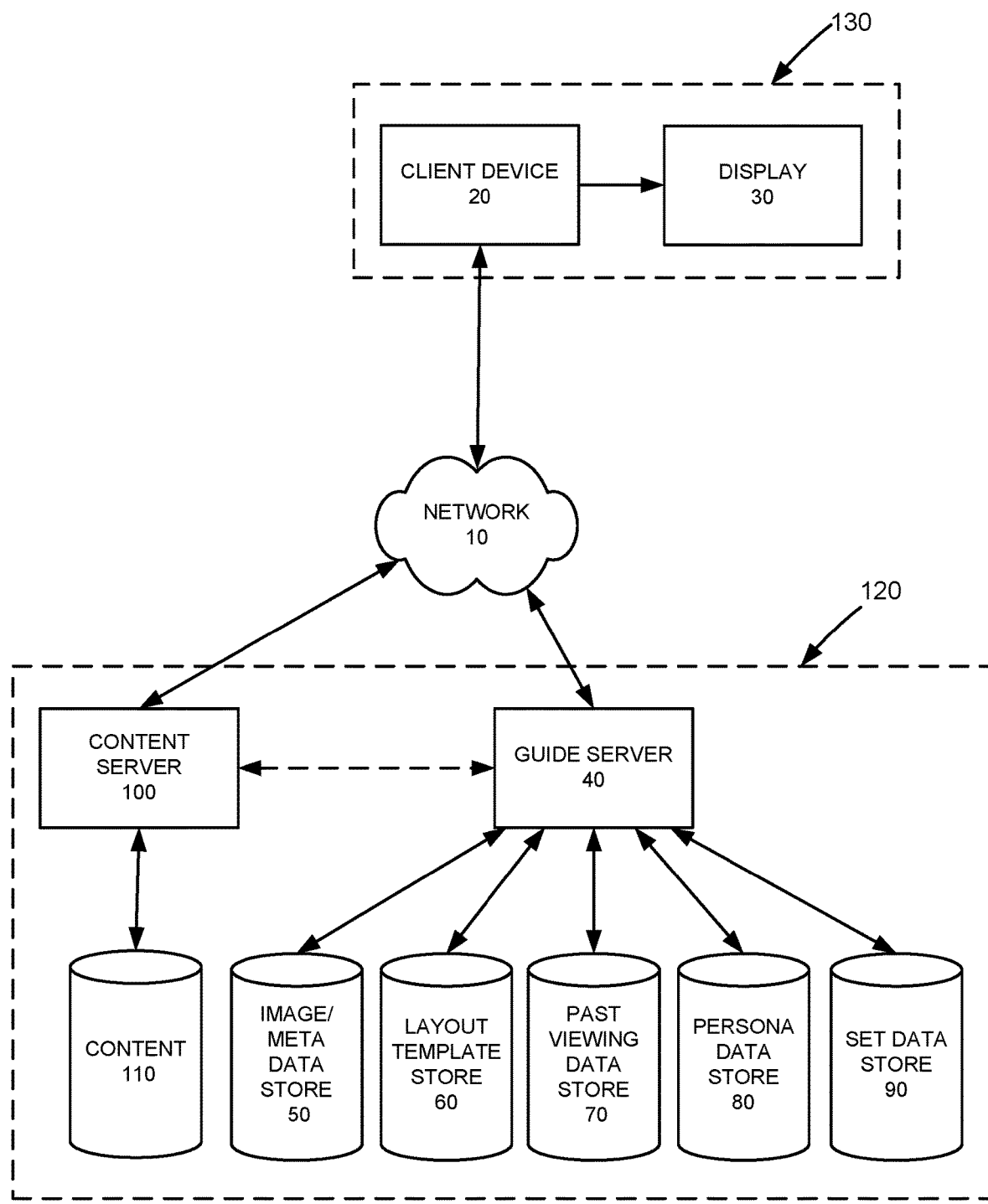
FIG. 1 is a diagram illustrating an example environment in which embodiments of a system may be provided.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A generalized embodiment provides a method and system for accessing representations for a plurality of corresponding media content items, each media content item having at least one corresponding representation, the representations being organized in an order in one or more sets of the representations, each representation comprising at least one of metadata for a corresponding media content item and an image for a corresponding media content item, each representation being for display to a user to enable the user to select to access the corresponding media content item, each set of representations being displayable as a scrollable list; using the order of the representations to determine display locations of the representations in the scrollable list in a display arrangement; comparing similarity of content of representations within a display range; and where representations are determined to have greater than a predetermined similarity, changing the order of at least one of the representations determined to have greater than a predetermined similarity to change the display location in the scrollable list of the at least one of the representations.

Avoiding presenting identical representations of media content items on a user interface avoids the appearance of a limited catalog of media content items available from a media content provider. Also, the avoidance of different but similar representations of media content items close to each other on a user interface provides an enhanced user experience and makes interpretation of the representations easier.

Media content items can comprise video or audio. The representation of a media content item can comprise an image, such as cover art, or metadata for the media content item, such as text information on the media content item associated with the media content item that can provide, for example, a description of the content of the media content item. The representation of the media content item is intended, when displayed to a user, to provide sufficient information on the media content item to the user. This enables the user to understand the content of the media content item, so as to be able to make an informed decision to make a selection for the retrieval or replay of a media content item by selecting the corresponding displayed representation.

The representations for media content items can be made available by a source separate to the source of the media content items. Correspondence or linking between the representations and the media content items can be provided by indexing or use of unique identifiers for the media content items and the corresponding representations. One media content item may have several representations, e.g. images or metadata, that can be used in different circumstances in different scrollable lists of representations for display to a user. This enables curators of scrollable lists to be able to select different representations for the same media content item in different circumstances, i.e. in different scrollable lists.

In one embodiment the display arrangement can comprise a user guide for a range of media content items available from one or more media content sources, including locally stored or recorded media content items and media content items available from one or more remote sources. Such remote sources may allow content to be freely available, available on a subscription basis, or available on a pay per view basis.

The scrollable lists can comprise representations for different types of media content items. For example, a scrollable list may comprise a list of representations for a set of media content items recommended to a user based on user history data and/or user preference data, and/or based on popularity of the media content items. A scrollable list may comprise a list of representations for a set of media content items that a user has watched previously, to enable them to re-watch media content items, or to continue to watch, if unfinished or part of a series. A scrollable list may also be curated by a user based on specifically selected media content items. Scrollable lists may also be provided by a media content item provider service that curates lists of media content items in sets, such as for example in genres, or media content provider sources.

The scrollable list of representations can comprise a scrollable list that can be scrolled in any direction on a display by a scrolling action of a user, e.g. a swipe direction on a touch screen or a screen that can detect user motion or motion, e.g. tilting to shaking, of the user device, or selection of an arrow key on a remote control. The scroll direction can be horizontal (a column), vertical (a row), or even diagonal. Also, the scroll direction need not be linear and can comprise an arc, a circle, or 'wheel' form.

The order can be changed by replacing at least one representation in at least one set of the representations, or by reordering the representations in at least one set of the representations.

The display range can comprise a display area for the display arrangement viewable by the user so that the determination of similarity between representations is considered within a viewable area of a user to reduce the likelihood of a user viewing two similar representations. The viewing area can depend on the device used by the user for viewing the scrollable list or lists. The form factor of the device will affect the display layout, as can the user display settings. Hence, device setting can be taken into account when determining the display area and hence the display range for the determination of similarity of representations. Representations that are well outside the display range of a device used by a user, need not be compared, since their similarity is unlikely to impact on the viewing experience of the user. The display range can even comprise a distance less than a display area for the display arrangement viewable by the user and a display range input can be received to set the display range. The display range input could be provided by an operator on a back end of the system or by the user of the user device, or the display range input could be computed, for example depending on the capabilities/settings of the user device. This provides the ability to tune the user viewing experience.

Where at least some of the representations comprise images, the similarity can be compared by comparing a similarity of a color distribution of pixels in at least some of the representations comprising images for corresponding media content items or by comparing a similarity of a color distribution of image features at least some of the representations comprising images for corresponding media content items. The features can comprise features identified in the image, such as shape features, or objects. The features can be identified using image processing, and more particularly feature extraction techniques.

To provide a further degree of tailoring of the user experience, the predetermined similarity can be set based on a similarity input. The similarity input could be provided by an operator on a back end of the system or by the user of the user device, or the similarity input could be computed, for example depending on the capabilities/settings of the user device.

When users scroll through representations, they will remember scrolled representations. The user may scroll forwards and backwards. In order to avoid user confusion, information on representations that have been viewed in the display arrangement by the user can be stored, and the order of the representations that have been viewed by the user in a list is maintained.

The method of avoiding or reducing the occurrence of similar representations viewed by a user can be performed on representations for a plurality of sets of representations, which are displayable in separately scrollable lists. When a plurality of scrollable lists are processed, the determining display locations step, the similarity comparing step, and the changing the order step can be performed for the representations in the sets for a plurality of relative scroll positions for the separately scrollable lists. In this manner, the comparisons become comparisons over a two-dimensional matrix of possible representation display locations.

Specific embodiments will now be described with reference to the figures.

With reference to FIG. 1, a diagram illustrating an example environment in which embodiments of a system may be provided.

A client system 130 (a user device) may comprise a single device, such as a computer, tablet, a smart TV, or smartphone including both a client device 20 and an integrated display 30. Alternatively, the client device 20 of the client system 130 may be separate to the display 30, e.g. a set top box and a TV. The client device 20 is connected to a network 10. The network 10 can comprise a wired network or a wireless network. It can comprise a local area network (LAN), a wide area network (WAN), or the Internet and it can use any known communication protocol for the transmission of data and media content items. Media content items may also be provided to the client device 20 by a separate communication channel, such as via a satellite connection, or terrestrial broadcast receiver (antenna).

Connected to the network 10 is a server system 120 for providing a display arrangement of scrollable lists in, for example a guide for accessing media content items. The server system 120 can be provided by a single system or it can be provided by separate server systems.

A guide server 40 is connected to the network 10 and provides the client device 20 with a display arrangement in the form of a guide. The guide server 40 is connected to a number of data sources, including a representation data store 50 for metadata and/or image representations for media content items, a layout template store 60 storing template data for layouts for the presentation of the scrollable lists, a past viewing data store 70 for the storage of data on the viewing history of users, a persona data store 80 storing persona data for users, including their preferences, a set data store 90 storing data on the sets of representations for the scrollable lists, including identifiers for the media content items and data for the representations, such as metadata or images, or links to the images in the representation data store 50. A content server 100 is provided and connected to the network 10 to provide media content items to the client device 20 for display on the display 30. The content server 100 accesses one or more content sources 110 to access and provide the content. For the formation of the set data for the scrollable lists, the guide server 40 can connect to and communicate with the content server 100 to access the content 110. The set data can be formed by the guide server 40 based on genre for content, recommendations for a user based on their viewing history and preferences, and curated content based on content that the service provider wishes to promote. Hence, a display arrangement, such as a guide can be formed of several scrollable lists or rails, each having a set of representations for a set of media content items based on different criteria, e.g. a rail of promoted content, a rail of content recommended to a use, and several rails of content for difference genres which can be displayed in an order based on a user's preference for genre.

The server system 120 can be provided by a single system or by a number of separate systems or data sources. A content server 100 is provided and connected to the network 10 to provide media content items to the client device 20 for display on the display 30. The content server 100 accesses one or more content sources 110 to access and provide the content. For the formation of the set data for the scrollable lists, the guide server 40 can connect to and communicate with the content server 100 to access the content 110. The set data can be formed by the guide server 40 based on genre for content, recommendations for a user based on their viewing history and preferences or content popularity, and curated content based on content that the service provider wishes to promote. Hence, a display arrangement, such as a guide can be formed of several scrollable lists or rails, each having a set of representations for a set of media content items based on different criteria, e.g. a rail of promoted content, a rail of content recommended to a user, and several rails of content for different genres which can be displayed in an order based on a user's preference for genre.

The content server 100 can be a separate system and can comprise a number of content servers 100. The content store 110 can comprise a number of content stores 110 associated with any number of content servers 100.

It is noted that the environment shown in FIG. 1 is exemplary. For example, alternative embodiments may comprise any number of client devices 20, content servers 100, and guide servers 40.

Figure 2:
FIG. 2 illustrates a display arrangement for representations of media content items in scrollable lists.

FIG. 2 illustrates a display arrangement 200, such as a guide, showing representations of media content items in scrollable lists.

The guide 200 includes three horizontally scrollable rails, 220, 230, and 240, of representations 210 in the form of images, such as cover art for movies. In this embodiment, the upper rail 220 comprises a set of representation for a set of media content items recommended to a user. The lower two rails 230 and 240 comprise rails representing sets of media content items in two genres "Action" and "Adventure".

Illustrated circled at 250 are two instances of copies of the same image representations for the same movie in adjacent locations in adjacent rails or scrollable lists. This illustrates an undesirable display result in a guide. It is a waste of available display space and can be interpreted by a user as the result of a limited catalog of media content items made available by the provider.

Figure 3A:
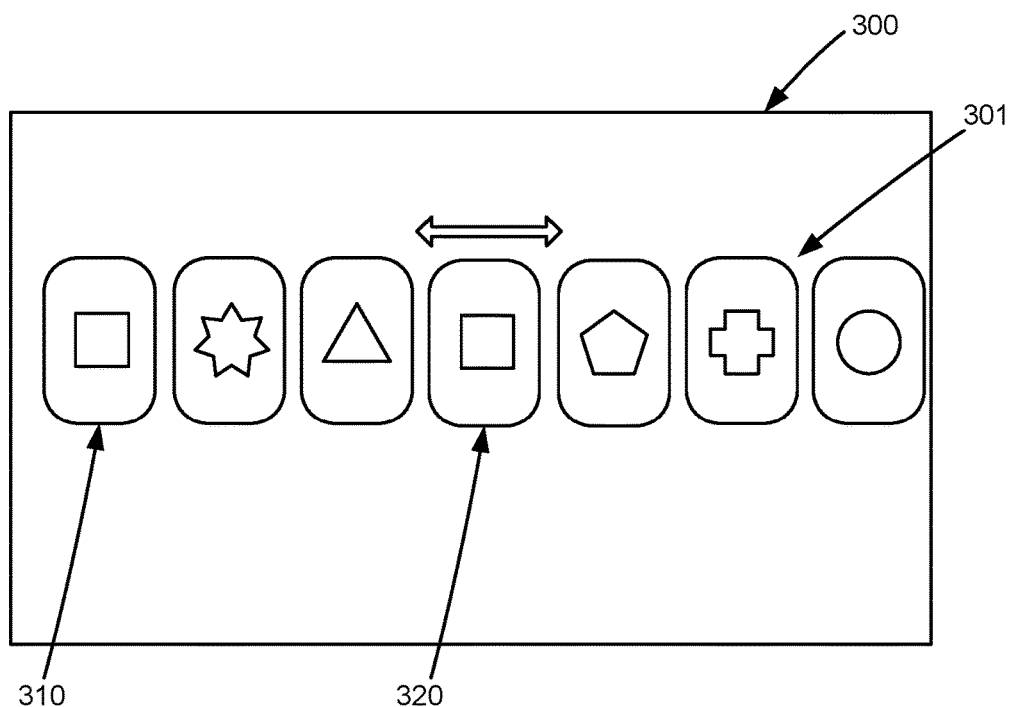
FIGS. 3A and 3B schematically illustrate the identification of identical representations in a single scrollable list of representations of media content items, in one embodiment.
Figure 3B:
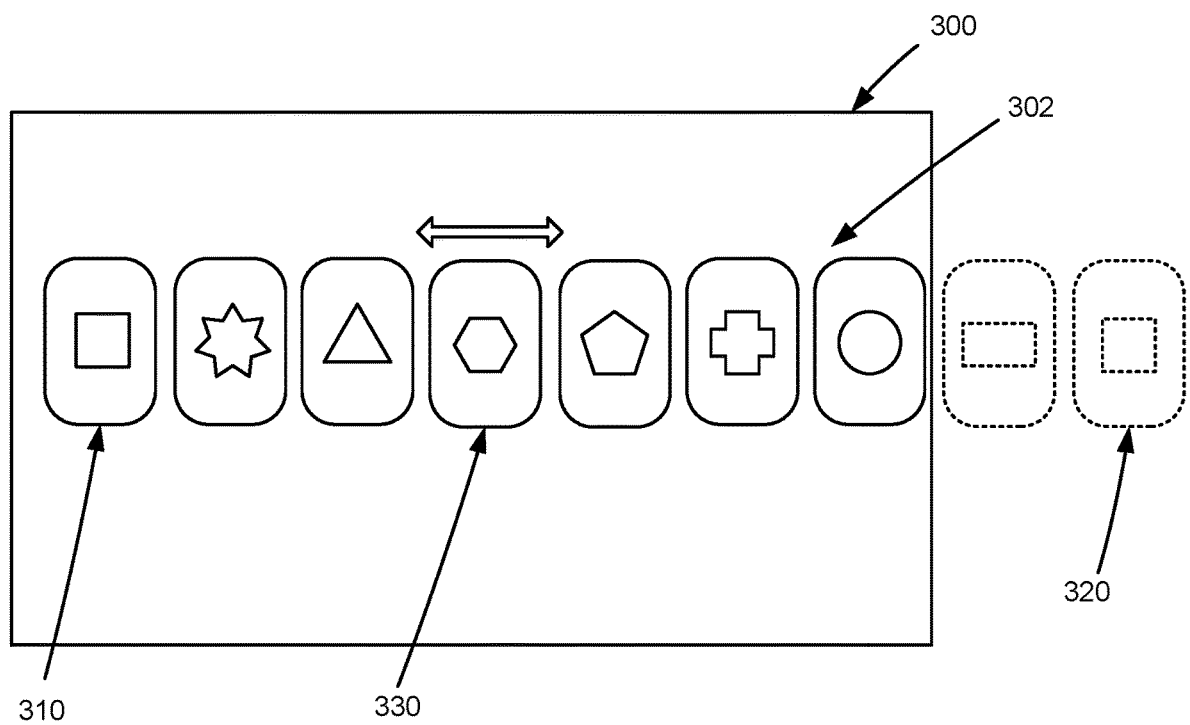

FIGS. 3A and 3B schematically illustrate the identification of identical representations in a single scrollable list of representations of media content items, in one embodiment.

In FIG. 3A a display area 300 can comprise an actual display area or a predicted display area for the display of a scrollable list 301. The scrollable list can be scrolled left or right in a horizontal manner as indicated by the double ended arrow, which is not displayed on the display area 300, and is merely illustrated in FIG. 3A to illustrate scroll directions. In the scrollable list, representations 310 and 320 are not adjacent but are within a predetermined range of one another. The predetermined range used in the determination of similarity or matching of representations can be the display area 300. The predetermined range can be defined by pixels or simply by the number of representations apart the displayed representations will be. In a linear rail as shown in FIGS. 3A and 3B, this can be simply a count of the representations in the ordered list of a set of representations. The range (threshold) can then simply be set as a number of representations to be spaced apart. The representations can comprise images or metadata.

With regard to the comparison of representations for the determination of similarity or matching, metadata can be compared based on the nature of the metadata. For example, identical text can be identified by a simple text comparison. Similar text can be compared by comparing the number of similar words or by parsing the text using natural language processing to determine semantics for comparison. Image representations can be compared using known image comparison techniques. For example, a color histogram of the colors of the pixels in the images can be determined and the color histogram compared or a simple percentage of pixels having a color can be determined and used as a comparison. Alternatively, features in the images can be identified by a feature extraction process and these features can be compared. Simple image comparisons can also be used on a pixel-by-pixel basis to identify identical images.

Once the duplicate representations are identified, one of them can be moved or replaced. A representation can be replaced with a different representation for the same media content item so that the set of media content items represented by the scrollable list is unchanged, or a representation of a new media content item can be used. Using different representations for the same media content item allows providers of content to promote certain media content items less intrusively to the user.

As shown in FIG. 3B, the result of the processing is the swapping of representation 320 with representation 330 to create a modified scrollable list 302, with the representation 320 moved to a position out of the display area and hence out of the predetermined range. In an alternative method, the representation can simply be removed without swapping another one in its place to reorder the list, and the removed representation can be reinserted in the list further away and out of the predetermined range.

The method described above can be performed before the display of the representations by predicting or determining the display locations of the representations and whether the similar representations would appear within the predetermined range, i.e. in the display area.

Hence, in the example of FIGS. 3A and 3B, the process reduces the likelihood of duplicate or similar representations on a single rail or scrollable list.

Figure 4:
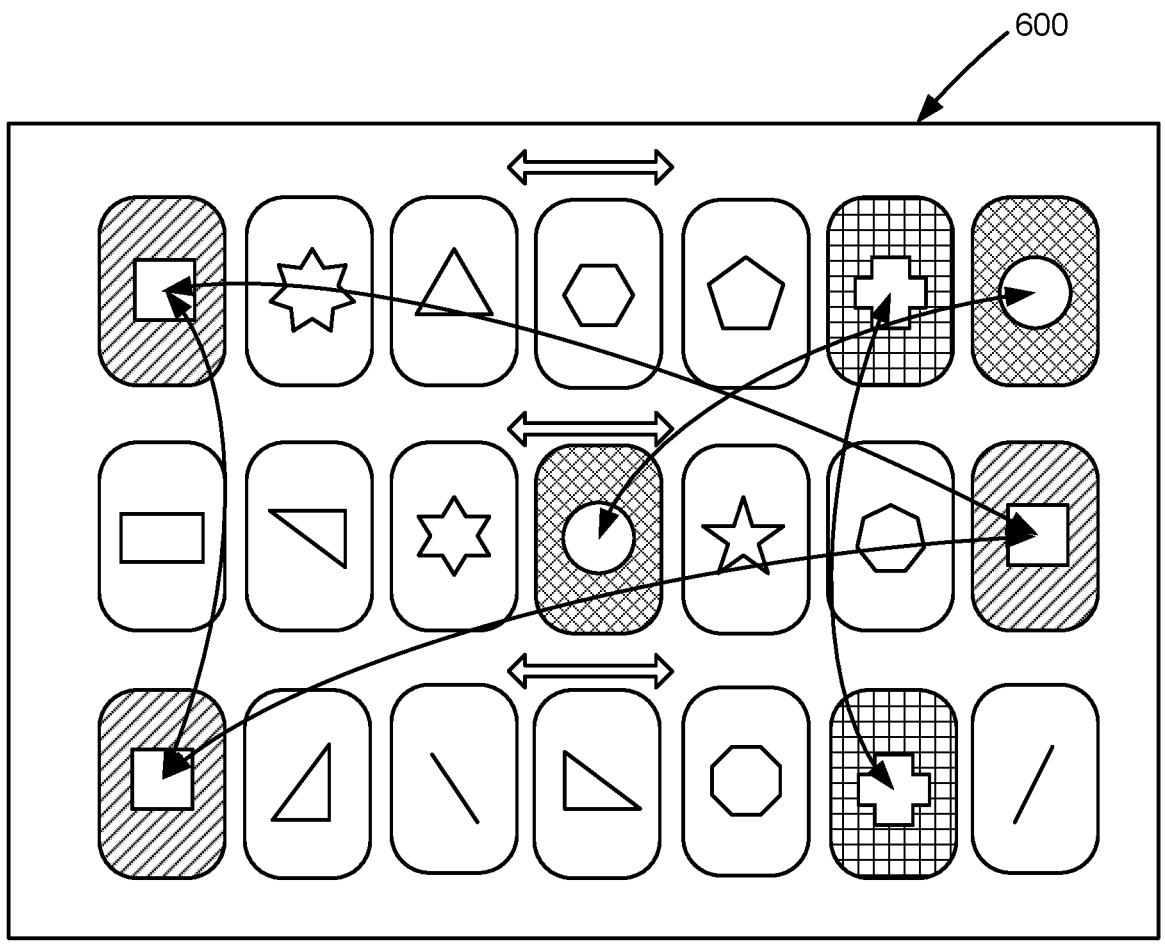
FIG. 4 schematically illustrates the identification of identical representations in multiple scrollable lists, in one embodiment.

FIG. 4 schematically illustrates the identification of identical representations in multiple scrollable lists, in one embodiment.

In this embodiment, the discussion with regard to the embodiment of FIGS. 3A and 3B apply apart form there is an extra dimensionality to the representation comparison problem, in that the similarity of representations is carried out not just within a list (looking left and right along the list) but also between the lists (looking up and down and diagonally between lists). In this example there are three scrollable lists or rails displayed and hence similarity of representations needs to be determined not just for representations within a rail, but also between rails. FIG. 4 illustrates the determination of a number of identical representations in the parts of the scrollable lists displayed in the display area 600.

In this embodiment, in order to avoid, or at least reduce, the occurrence of duplicates, the sets of representations are processed before being displayed to the user to compare the predicted possible display combinations for the representations of the three scrollable lists. The set of representations for each scrollable list need to be compared with incremental relative positions to simulate all possible user scroll operations (left and right scrolls) with identified identical representations that appear within the predetermined range defined by the virtual display area 600 being moved or swapped as necessary to try to achieve the best possible distribution of representations with the minimum occurrence of identical representations in the display area 600.

Figure 5:
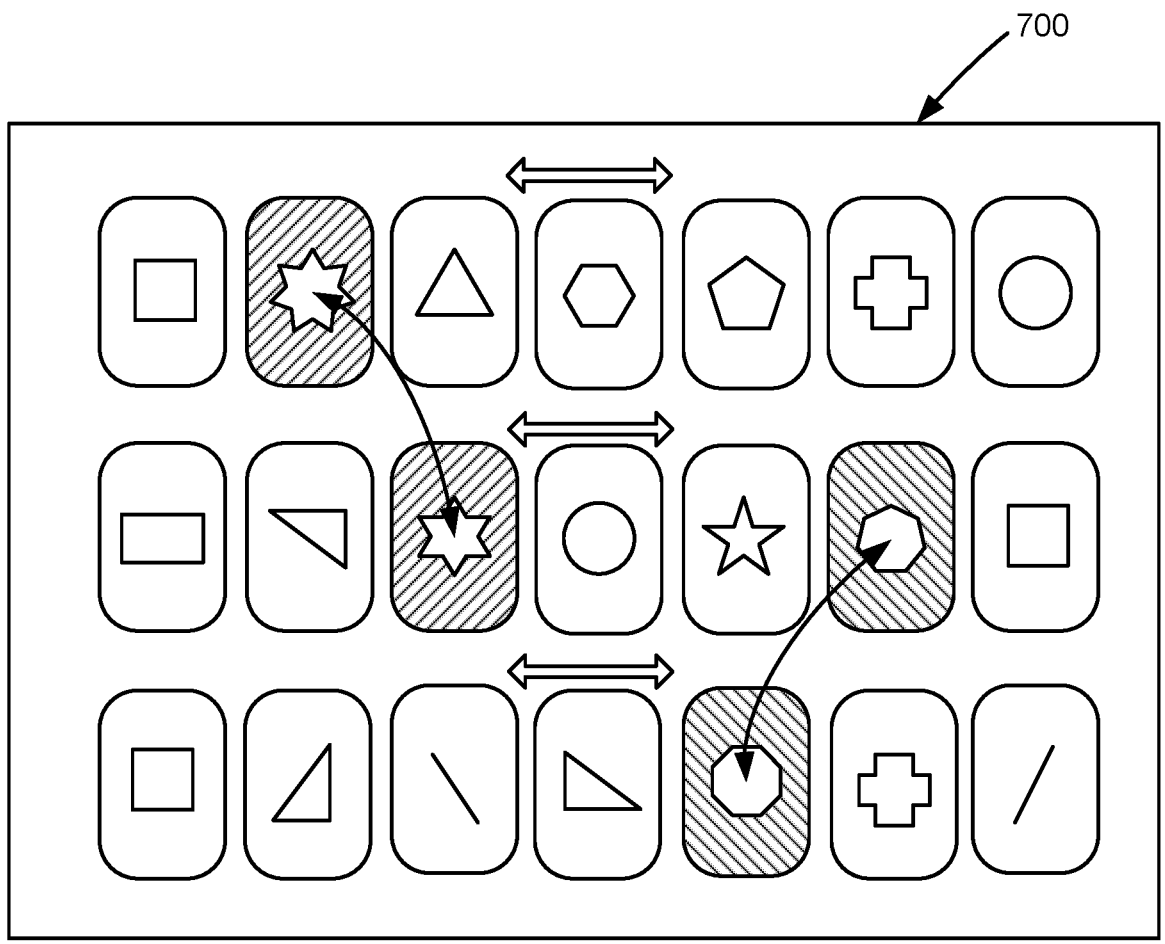
FIG. 5 schematically illustrates the identification of similar representations in multiple scrollable lists, in one embodiment.

FIG. 5 schematically illustrates the identification of similar representations in multiple scrollable lists, in one embodiment.

This embodiment operates on a similar manner as for FIG. 4, except that rather than simply identifying identical representations, similar representations are identified based on a similarity threshold. This threshold can comprise a percentage of matching text for metadata representations and a percentage of matching pixels or pixel colors for image representations.

In the comparison method, the degree of similarity of representations can be set based on a user input. Also, the distance between similar representations or the predetermined range can be set based on a user input. Also, the degree of similarity and distance or range can be set differently for within a rail or scrollable list compared with between rails or scrollable lists.

Where there are multiple scrollable lists, the process can be restricted to only identify similar representations within each scrollable list separately.

The process can be performed at the server system 120 before the guide or display arrangement is sent to the client device as a download, or dynamically as the client device interacts with the server system 120 to request updated display data during scrolling by a user. Alternatively, the process could be performed at the client device as a preprocessing before display, or dynamically as the display is being generated during scrolling by the user.

As a user performs scrolling operations, where the process is performed dynamically, the scrolling operation of the user is detected and stored and used in the representation comparison processes to avoid moving or replacing any representations that the user has viewed, in case a user re-scrolls back and is confused when representations have moved.

Figure 6:
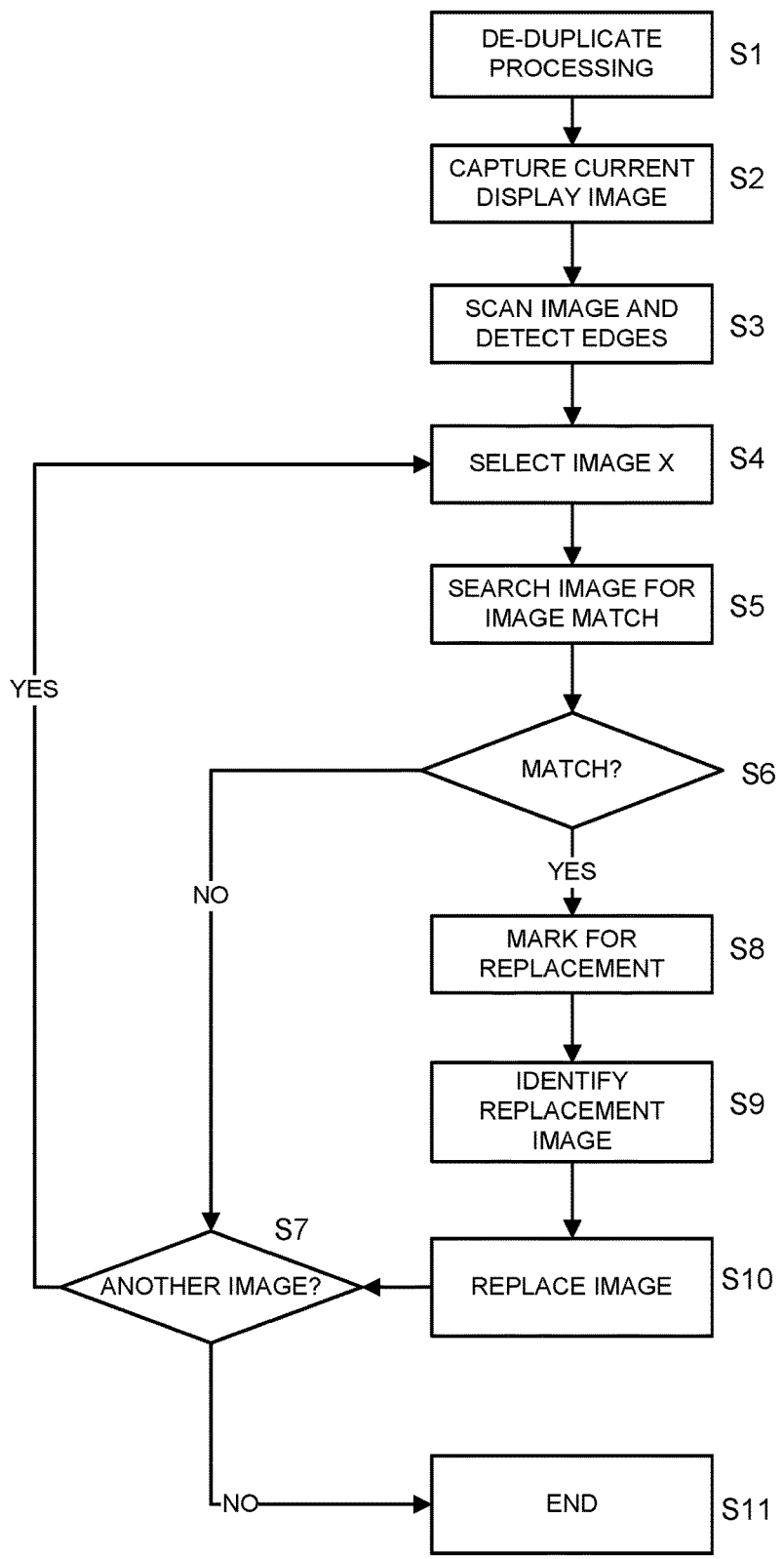
FIG. 6 is a flow diagram of an example method for replacing similar image representations, in one embodiment.

FIG. 6 is a flow diagram of an example method for replacing a matching image representation.

In step S1 the deduplicating process begins. In step S2, an image of the display is captured and in step S3 the image is scanned to detect the edges of the representations, which in this embodiment comprise images (representation images). A representation image is selected for processing in step S4 and in step S5 a search is performed across the image of the display for another representation image that is within a similarity threshold to the representation image. If no match is determined (step S6), in step S7 it is determined whether there is another representation image for processing. If so, the process returns to step S4 and if not, the process ends in step S11. If in step S6 a match is determined, in step S8 the representation image is marked for replacement, a replacement is identified in step S9, and the representation image is replaced in step S10. In step S7 the process then determines whether there is another representation image for processing. If so, the process returns to step S4 and if not, the process ends in step S11.

Figure 7:
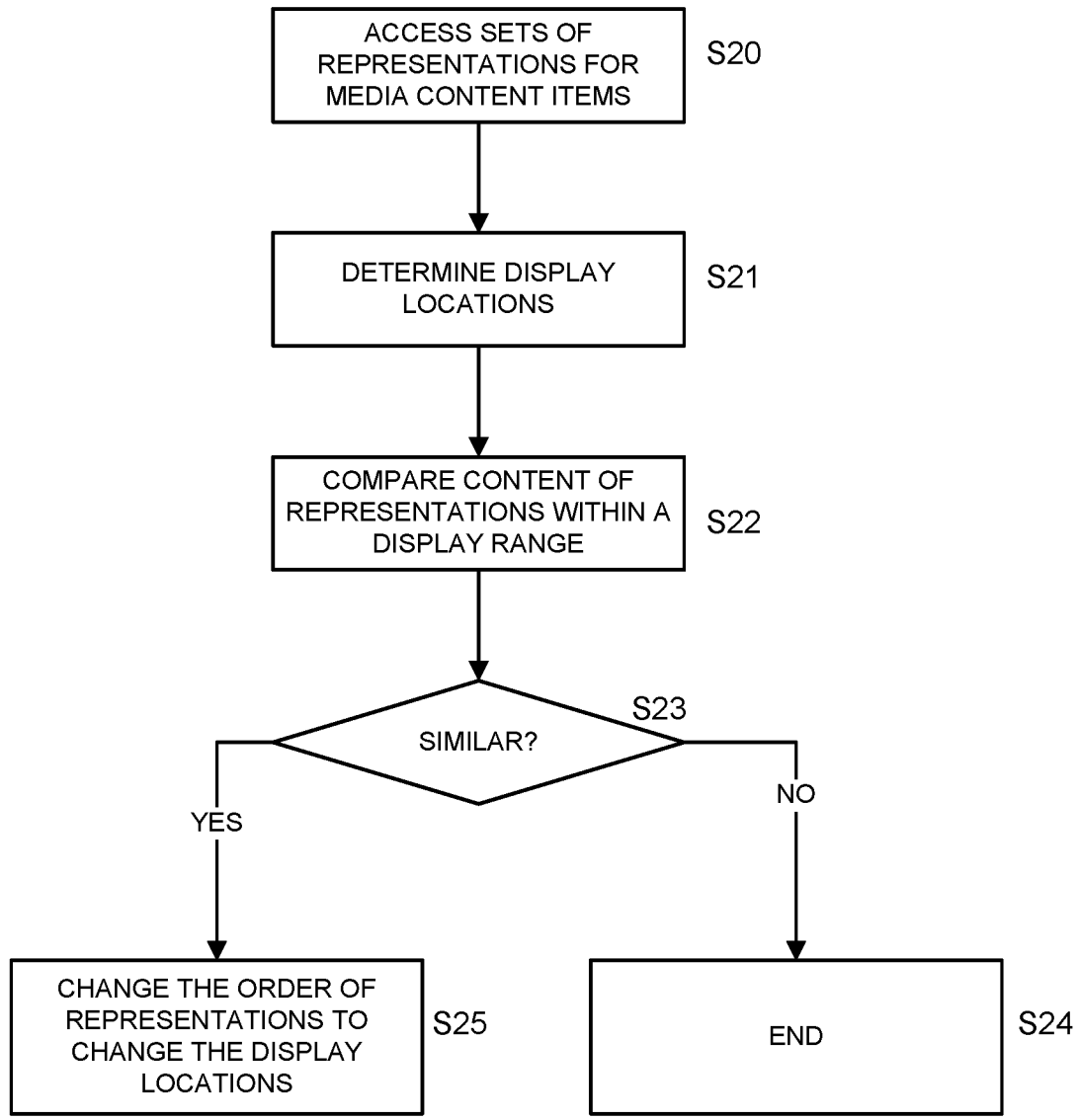
FIG. 7 is a flow diagram of an example method for changing the order of representations to change the display locations, in one embodiment.

FIG. 7 is a flow diagram of an example method for changing the order of representations to change the display locations, in one embodiment.

In step S20 representations for a plurality of corresponding media content items are accessed. Each media content item has at least one corresponding representation, and the representations are organized in an order in one or more sets of the representations. Each representation comprises at least one of metadata for a corresponding media content item and an image for a corresponding media content item, and each representation is for display to a user to enable the user to select to access the corresponding media content item. Each set of representations are displayable as a scrollable list.

In step S21 the order of the representations is used to determine display locations of the representations in the scrollable list in a display arrangement. In step S22 similarity of the content of representations within a display range is compared. If the similarity is below a predetermined threshold, the process ends at step S24. If the representations are determined to have greater than a predetermined similarity, the order of at least one of the representations determined to have greater than a predetermined similarity is changed to change the display location in the scrollable list of the at least one of the representations.

Figure 8:
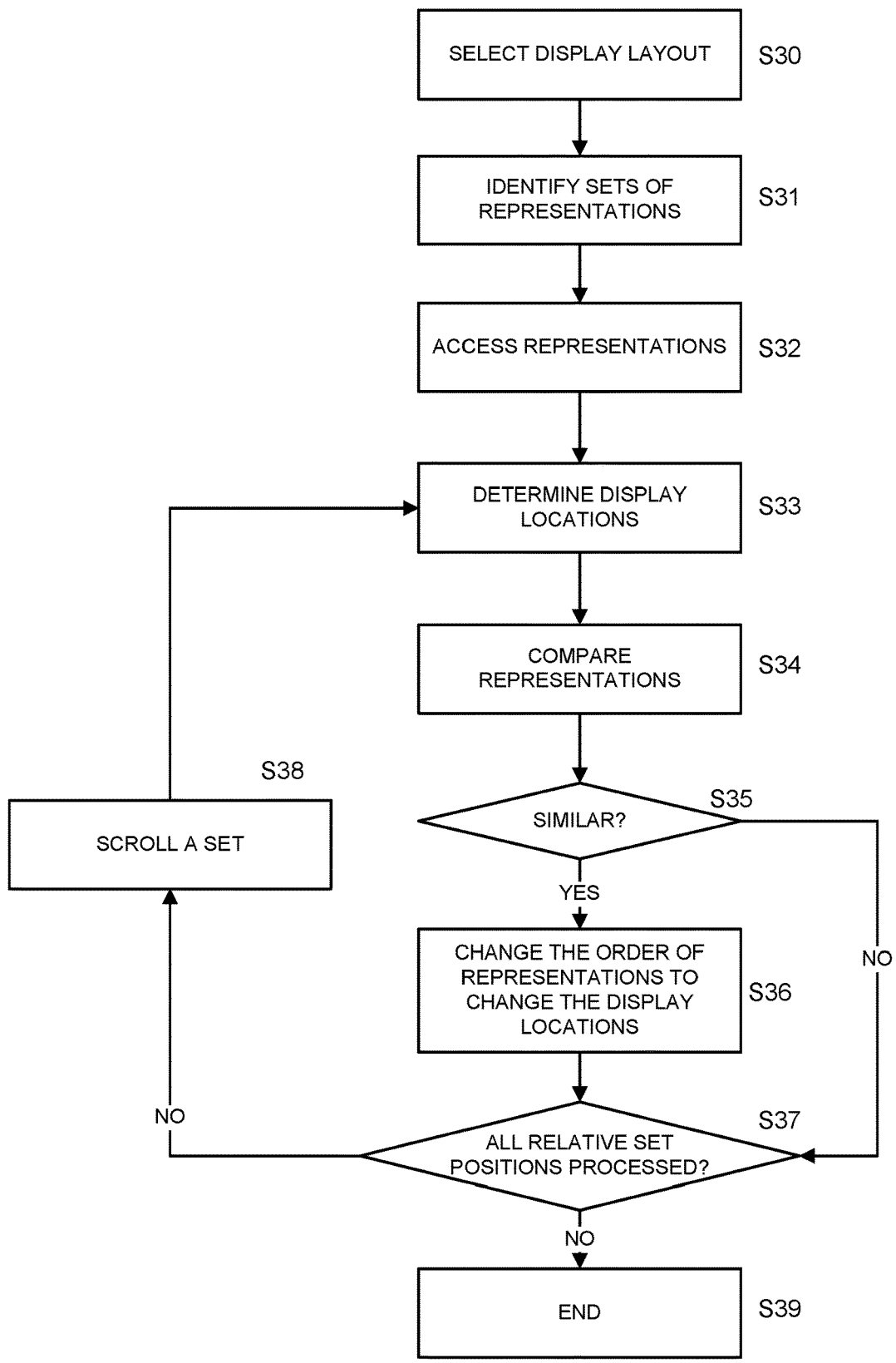
FIG. 8 is a flow diagram of another example method for changing the order of representations to change the display locations, in one embodiment.

FIG. 8 is a flow diagram of another example method for changing the order of representations to change the display locations, in one embodiment.

In step S30 a display layout is selected. This can be based on a template stored in the template store and based on a display capability or requirement of a user device. In step S31 sets of representations for display are identified and in step S32, the representations are accessed from the representation data store. In step S33 display locations for the representations are determined. This can be based on an initial configuration which can be defined by the template for example. In step S34 the representations are compared for similarity and if in step S35 it is determined that the representations are similar within the predetermined threshold, in step S36 the order of representations is changed to change the display locations. Steps S34 to S36 comprises a matrix comparison of representations within and across scrollable lists as discussed above.

In step S37 the process determines whether all relative set positions for the sets of representations have been processed. If so, the process ends in step S39. If not, in step S38 a set is scrolled relative to the other sets and the process returns to step S33 to the processing of this revised display arrangement.

If in step S35 no similar representations are found, the process jumps past step S36 to step S37.

In the method of this embodiment, all possible combinations of display positions for all scroll combinations for sets of representations are tested to try to reduce the possibility of similar representations appearing in the displayed arrangement when displayed to a user. In this embodiment, the sets of representations are processed before any user interaction for download to a user as a user guide.

Figure 9:
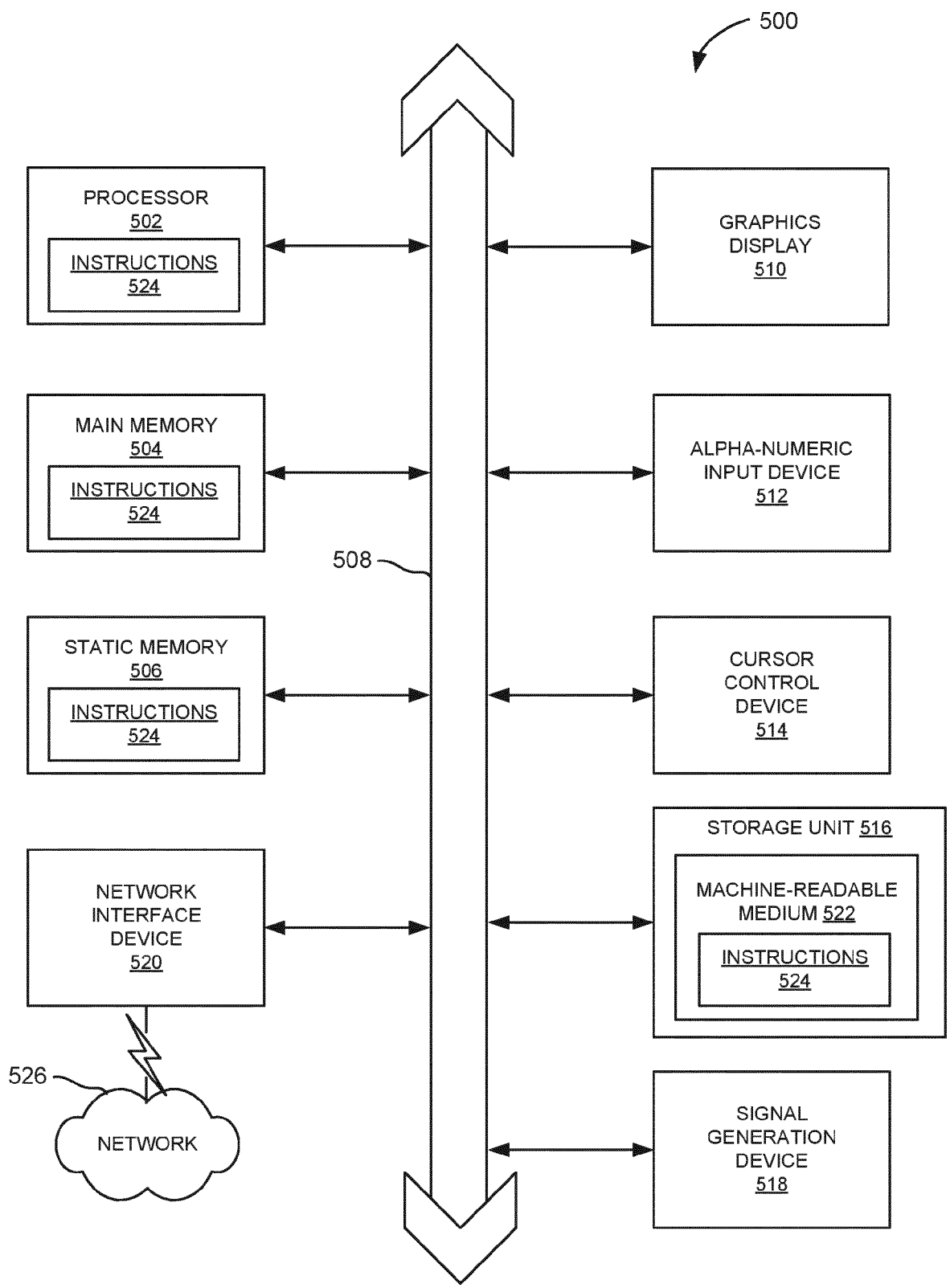
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system and within which instructions 524 (e.g., software, a program, an application, an applet, an app, or other executable code) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The machine 500 may also include an alpha-numeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable storage medium 522 on which is stored the instructions 524 embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520.

As used herein, the term "memory" refers to a machine-readable storage medium able to store data temporarily or permanently and may be taken to include, but not be limited to, random-access memory (RAM), read-only memory (ROM), buffer memory, flash memory, and cache memory. While the machine-readable storage medium 522 is shown in an example embodiment to be a single medium, the term "machine-readable storage medium" should be taken to include a single medium, or multiple media (e.g., a centralized or distributed database, or associated caches and servers) able to store instructions. The term "machine-readable storage medium" shall also be taken to include any medium, or combination of multiple media, that is capable of storing instructions for execution by a machine (e.g., machine 500), such that the instructions (e.g., instructions 524), when executed by one or more processors of the machine (e.g., processor 502), cause the machine to perform any one or more of the methodologies described herein. Accordingly, a "machine-readable storage medium" refers to a single storage apparatus or device, as well as "cloud-based" storage systems or storage networks that include multiple storage apparatus or devices. The term "machine-readable storage medium" shall accordingly be taken to include, but not be limited to, one or more data repositories in the form of a solid-state memory, an optical medium, a magnetic medium, or any suitable combination thereof.

Furthermore, the tangible machine-readable storage medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 524 may further be transmitted or received over a communications network 526 using a transmission medium via the network interface device 520 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible machine-readable medium that is capable of storing, encoding, or carrying instructions for execution by the machine 500, and includes digital or analog communications signals or other intangible medium to facilitate communication of such software.

In this specification the term machine-readable medium is used to describe a tangible machine-readable storage medium and a transitory or transmission medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. A computer-implemented method comprising:
   accessing representations for a plurality of corresponding media content items, each media content item having at least one corresponding representation, the representations being organized in a first order in one or more sets of the representations, each representation comprising at least one of metadata for a corresponding media content item and an image for a corresponding media content item, each representation being for display to a user to enable the user to select to access the corresponding media content item, each set of representations being displayable as a respective scrollable list;
   using the first order of the representations to determine display locations of the representations in a scrollable list in a display arrangement;
   comparing similarity of content of representations within a display range, wherein the display range comprises two or more scrollable lists; and
   in response to determining that representations within the display range have greater than a predetermined similarity, analyzing a plurality of orders for the representations in the one or more sets to determine a second order for the representations in the one or more sets wherein the second order exhibits fewer possible duplicate representations within the display range than the first order.

2. The computer-implemented method of claim 1, wherein determining the second order comprises changing the first order by replacing at least one representation in at least one set of the representations.

3. The computer-implemented method of claim 2, wherein changing the first order comprises reordering the representations in the at least one set of the representations.

4. The computer-implemented method of claim 1, wherein the display range comprises a display area for the display arrangement viewable by the user.

5. The computer-implemented method of claim 1, wherein the display range comprises a distance less than a display area for the display arrangement viewable by the user.

6. The computer-implemented method of claim 1, further comprising receiving an input to set the display range.

7. The computer-implemented method of claim 1, wherein comparing the similarity comprises comparing a similarity of a color distribution of pixels in at least some of the representations comprising images for corresponding media content items.

8. The computer-implemented method of claim 1, wherein comparing the similarity comprises comparing a similarity of a color distribution of image features at least some of the representations comprising images for corresponding media content items.

9. The computer-implemented method of claim 1, further comprising receiving an input to set the predetermined similarity.

10. The computer-implemented method of claim 1, wherein the computer-implemented method is performed in response to a scroll input by a user to cause the scrollable list to scroll.

11. The computer-implemented method of claim 10, further comprising storing information on representations that have been viewed in the display arrangement by the user, wherein determining the second order of for the representations includes maintaining respective orders of any of the representations that have been viewed by the user.

12. The computer-implemented method of claim 1, wherein the computer-implemented method is performed on representations for a plurality of sets of representations, wherein the representations for each set of representations are displayable in separately scrollable lists.

13. The computer-implemented method of claim 12, wherein determining the display locations, the similarity comparing the similarity of the content, and determining the second order are performed for the representations in the sets for a plurality of relative scroll positions for the separately scrollable lists.

14. A system comprising:
    at least one processor; and
    a non-transitory storage medium storing instructions which, when executed by the at least one processor of a machine, cause the machine to perform operations comprising:
       accessing representations for a plurality of corresponding media content items, each media content item having at least one corresponding representation, the representations being organized in a first order in one or more sets of the representations, each representation comprising at least one of metadata for a corresponding media content item and an image for a corresponding media content item, each representation being for display to a user to enable the user to select to access the corresponding media content item, each set of representations being displayable as a respective scrollable list;
       using the first order of the representations to determine display locations of the representations in a scrollable list in a display arrangement;
       comparing similarity of content of representations within a display range, wherein the display range comprises two or more scrollable lists; and
       in response to determining that representations within the display range have greater than a predetermined similarity, analyzing a plurality of orders for of the representations in the one or more sets to determine a second order for the representations in the one or more sets wherein the second order exhibits fewer possible duplicate representations within the display range than the first order.

15. A non-transitory machine-readable storage medium storing instructions which, when executed by at least one processor of a machine, cause the machine to perform operations comprising:

accessing representations for a plurality of corresponding media content items, each media content item having at least one corresponding representation, the representations being organized in a first order in one or more sets of the representations, each representation comprising at least one of metadata for a corresponding media content item and an image for a corresponding media content item, each representation being for display to a user to enable the user to select to access the corresponding media content item, each set of representations being displayable as a respective scrollable list;

using the first order of the representations to determine display locations of the representations in a scrollable list in a display arrangement;

comparing similarity of content of representations within a display range, wherein the display range comprises two or more scrollable lists; and in response to determining that representations within the display range have greater than a predetermined similarity, analyzing a plurality of orders for of the representations in the one or more sets to determine a second order for the representations in the one or more sets wherein the second order exhibits fewer possible duplicate representations within the display range than the first order.

\* \* \* \* \*